May 22, 1962

M. S. LEMMETTY 3,035,456

HYDRAULIC TRANSMISSION GEAR FOR THE REGULATION OF THE
TRANSMISSION RATIO STEPLESSLY TOGETHER WITH
REVERSING AND FREE CLUTCH DEVICES

Filed Jan. 11, 1960

INVENTOR.
MATTI SALOMO LEMMETTY
BY

ATTORNEY.

May 22, 1962
M. S. LEMMETTY
3,035,456
HYDRAULIC TRANSMISSION GEAR FOR THE REGULATION OF THE
TRANSMISSION RATIO STEPLESSLY TOGETHER WITH
REVERSING AND FREE CLUTCH DEVICES
Filed Jan. 11, 1960
2 Sheets-Sheet 2
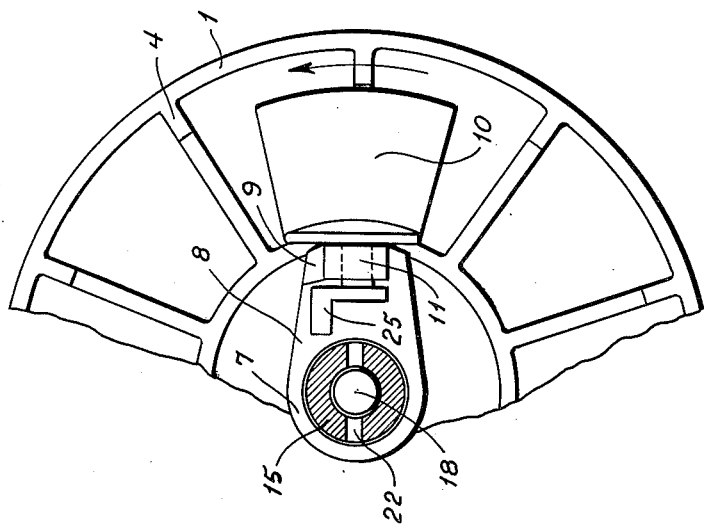
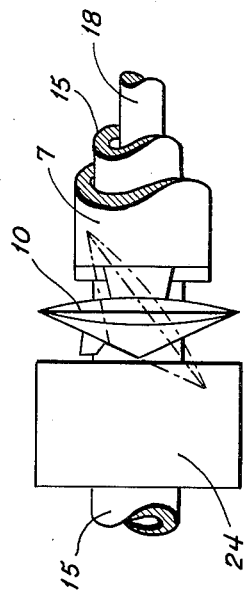
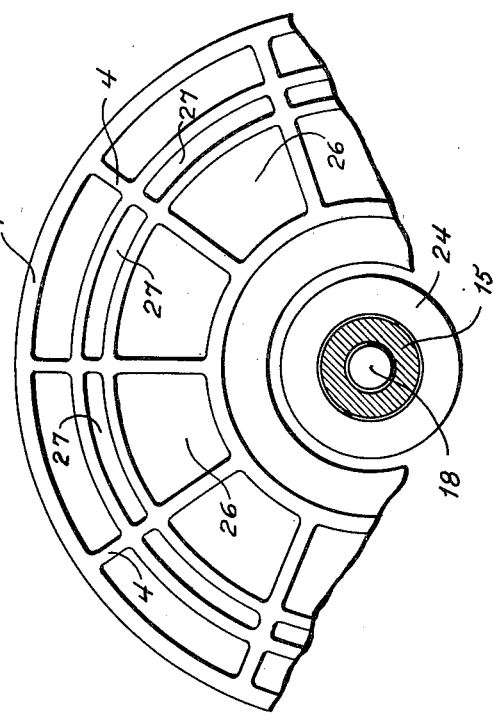
INVENTOR.
MATTI SALOMO LEMMETTY
BY
ATTORNEY.

United States Patent Office 3,035,456
Patented May 22, 1962

3,035,456
HYDRAULIC TRANSMISSION GEAR FOR THE REGULATION OF THE TRANSMISSION RATIO STEPLESSLY TOGETHER WITH REVERSING AND FREE CLUTCH DEVICES
Matti S. Lemmetty, Helsinki, Finland, assignor to RPM Kommandiittiyhtio P. Wuorenjuuri, Helsinki, Finland, a Finnish company
Filed Jan. 11, 1960, Ser. No. 1,589
2 Claims. (Cl. 74—730)

The regulation of the transmission ratio between a motor and a driven shaft and, in addition to such regulation, the reversing of the direction of rotation of the driven shaft have not been satisfactorily achieved up to now. Toothed transmission gears have to mesh with other gear wheels for each variation and thus they function by steps and not smoothly in changing from one speed to another. Frictional gears are unreliable and weak. Hydraulic turbine devices and those working on the pump principle are complicated and expensive, as too are piston-type devices.

These drawbacks are eliminated in the present invention which consists of a hydraulic transmission gear for the regulation of the transmission ratio steplessly together with reversing and free clutch devices. In it, transmission is effected through a ring of fluid created by centrifugal force in a cylindrical case rotated by the driving shaft and partly filled with said fluid acting on propeller devices in the same rotating case which turn concentrically with it and are connected to the driven shaft by mechanical transmission through the hollow intermediary shafts on which they are fitted. The propellers can be made to rotate faster or slower by varying the pitch of their blades. They are fitted consecutively along the axis of rotation and are connected to each other and to the driven shaft in such a way that both of them turn the driven shaft in opposed directions and that, by mechanical means, alternatively one or the other can be put into the operating position with the pitch of the blades turned from zero to form an angle with the direction of rotation, or both of them can be kept in the neutral position with the pitch of the blades at zero.

The principal feature of this invention is that the adjacent oil compartments of the rotating case are connected by openings in the partition wall between them.

The accompanying drawings illustrate one embodiment of the invention.

FIGURE 2 shows the propeller device seen radially from the tip of the propeller blade.

FIGURE 3 is a partial transverse section along I—I in FIG. 1, and

FIGURE 4 is a partial transverse section along II—II in FIG. 1.

Figure 1:
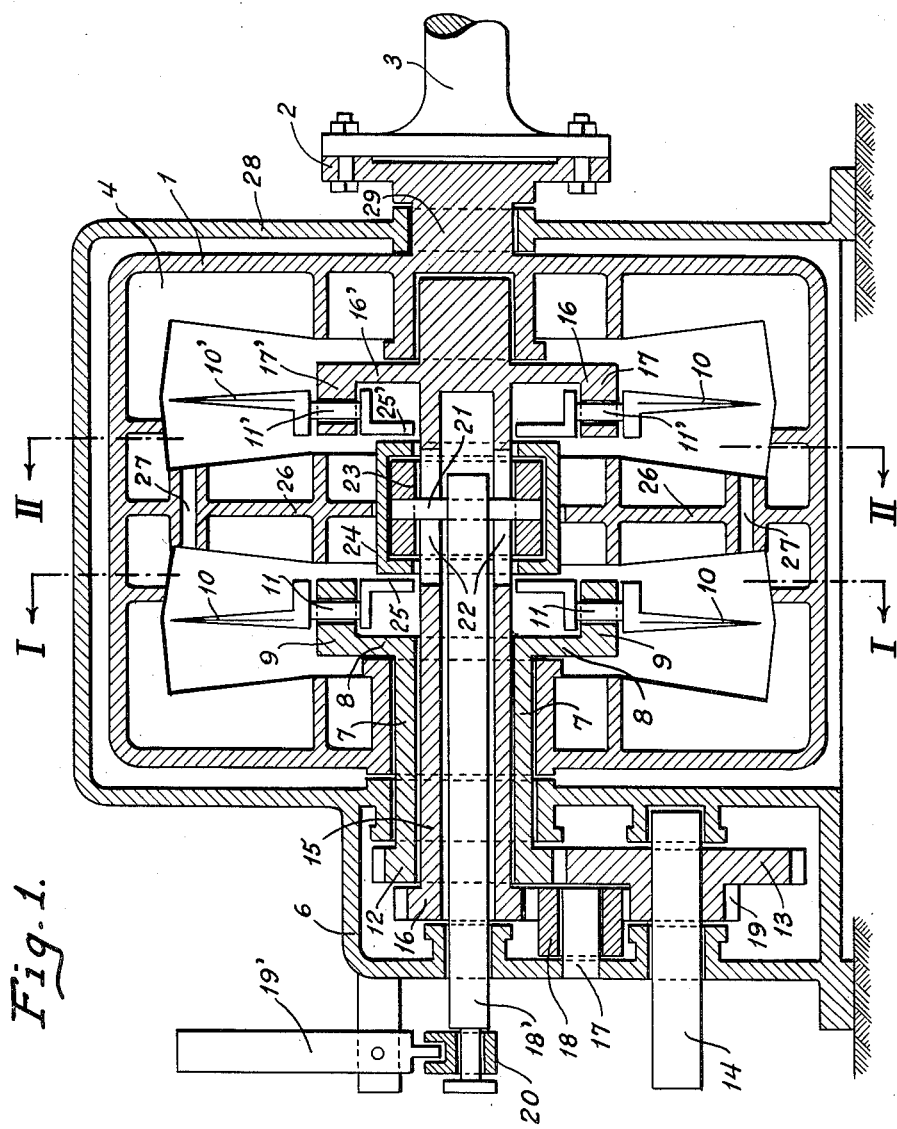
FIGURE 1 shows the device according to the invention in longitudinal elevational section.

A rotating case 1 is coupled by flanges 2 to the driving shaft of a motor. On the inner cylindrical surface of the case 1 is a group of ribs 4, the purpose of which is to render more effective the rotation of the fluid in the case by drawing it along with them. On the left side of the case (FIG. 1) is a gear box 6. The gear box 6 and the rotating case 1 are connected by a hollow shaft 7, to the end of which, inside the rotating case 1, is attached the hub 8 of the first propeller device.

On the hub 8 are radial guiding sockets 9 for the attachment and pitch variation shaft 11 of the propeller blades 10. On the left-hand end of the tubular shaft 7, in the gear box 6, is fitted a gear-wheel 12 which meshes with a gear-wheel 13 on the driven shaft 14 leading away from the gear box. The various ball bearings used in the device are not shown in the drawings as their application as such is known.

Inside the outer hollow shaft 7 is fitted a second hollow shaft 15 on the left-hand end of which, in the gear box 6, is a gear wheel 16 connected to a gear wheel 19 on the driven shaft 14 through an intermediate shaft 17 and another gear wheel 18.

On the other end of the hollow shaft 15 is a hub 16' with sockets 17' for the attachment and pitch-variation shafts 11' of propeller blades 10'. Inside the hollow shaft 15 is a push rod or shaft 18', the left end of which extrudes in the drawing from the gear box 6; to this end of it is attached one end of a lever arm 19' by means of a sliding bearing 20. A sleeve 23 is fastened to the other end of the sliding shaft or rod 18' by means of a pin 21 which is passed through a slot 22 in the hollow shaft 15. The sleeve 23 rotates together with the hollow shaft 15 and the push rod 18', and over it is a flanged ring 23 which does not rotate. When the lever arm 19' is moved, one of the flanges of this ring thrusts against either spigots 25 or spigots 25' fixed to shafts 11, 11', of propeller blades 10, 10' and thereby alters the pitch of the blades 10 or 10'.

The two propellers are fitted each in its own compartment in case 1. The latter are separated by a partition wall 26, which turns with the case 1. In the partition wall 26, there are several openings 27 connecting the two oil compartments in the case 1.

28 in the drawing is a fixed outer casing through which an axle 29 connects the rotating case 1 to the motor (not shown) through a flange 2 and the driving shaft 3.

The hydraulic transmission gear of the invention functions as follows:

When the propeller blades 10, 10' are in the position shown in FIG. 1, the gear device is in the zero or free position. The blades 10, 10' of both propellers are parallel to their direction of rotation and the fluid in the case 1, preferably oil, has, under the effect of centrifugal force, formed a fluid ring against the outer walls of both compartments of the case 1, which is rotating at the same r.p.m. as the motor. The surface formed in this way by the oil, which is in the shape of the inner surface of a cylinder, should completely cover the openings 27, being slightly nearer to the central shaft than said openings. When the free end of the lever arm 19' is moved towards the gear box, the push shaft 18' is drawn outwards (to the left), bearing with it the flanged ring 24 and thrusting the left-hand flange of the latter against spigots 25, which, on being turned sideways, turn the blades 10 obliquely to their direction of rotation so that the oil causes them to rotate in the same direction as the case (FIG. 2). The power acting on the blades increases in proportion as the blades are turned across their direction of rotation, i.e. as the pitch of the blades is increased. Simultaneously, the blades cause a resistance to the rotation of the oil and press the latter, in this case, against the left wall. More oil is thus sucked through the openings 27 into the left-hand compartment of the case, which likewise increases the power of the oil on the propeller blades until a state of equilibrium is achieved. At the same time, the other propeller, the blades 10' of which are still in the zero position, has begun to turn in the opposite direction through the action of gear wheels 12, 13, 19, 18 and 16. Thanks to the action of blades 10, however, the oil covering blades 10', which are rotating in the opposite direction, decreases, thereby improving the efficiency ratio of the whole gear device.

To reverse the direction of rotation of the driven shaft 14, blades 10 are returned to the zero position by returning the lever arm 19' to its vertical position; the flange of the ring 24 breaks contact with the spigots 25 and the oil ring presses the blades 10 back to their zero position, and returns to the same thickness in both halves of the case. The lever arm 19' is then pulled outwards, away from the gear box 6, thereby pushing the sliding rod 18' and flanged ring 24 inwards, thrusting the right-hand flange of said ring 24 against spigots 25' and turning propeller blades 10' on their shafts 11' so that said blades are rotated by the oil as their pitch increases in the manner previously described, their direction now being the same as that of the oil and rotating case 1. Blades 10' now force the oil against the right-hand wall of said case and diminish the thickness of the oil ring in the other half of the case, so that the resistance between the oil and blades 10, which are now rotating in the opposite direction, is reduced.

It is obvious that to increase the turning moment of the driven axle for heavy loads, a greater number of pairs of propellers and corresponding gear arrangements can be fitted than those described above, and that the details of the invention can be varied in other respects, too, without exceeding the limits of the invention.

What I claim is:

1. A hydraulic transmission gear for stepless regulation of the transmission ratio comprising in combination with a driving shaft and a driven shaft, a cylindrical case rotated by said driving shaft, said case being adapted to be partly filled with a fluid forming by centrifugal action a hydraulic ring rotating along with said case, a plurality of propeller devices, including blades, located in said casing in spaced axial relationship with said blades adapted to be located within said hydraulic ring, said propeller devices also including means for varying the pitch of said propeller devices from a position where said blades lie in a radial plane of said hydraulic ring to a position transversely of said radial plane, a pair of hollow telescoped shafts extending into said case and mounted concentrically with respect thereto, one of said propeller devices mounted to rotate with one of said shafts and the other of said propeller devices mounted to rotate with the other of said shafts, driving means for operatively connecting one of said shafts with said driven shaft to rotate said driven shaft in one direction and means for operatively connecting the other of said shafts with said driven shaft to rotate said driven shaft in the opposite direction, means extending through said shafts and engageable with said pitch varying means to selectively move one or the other of said blades to desired pitch position between said radial and transverse positions while leaving the other of said blades in radial position and said selective means being positionable to retain the blades of both of said propeller devices in said radial position at the same time, said case being formed with a radial partition therein positioned between said propeller devices and separating said case into compartments, said partition being formed with openings therethrough adjacent the periphery of said case, whereby oil may flow from one side of said partition to the other in response to the action of said blades.

2. A hydraulic transmission gear for stepless regulation of the transmission ratio comprising in combination with a driving shaft and a driven shaft, a cylindrical case rotated by said driving shaft, said case being adapted to be partly filled with a fluid forming by centrifugal action a hydraulic ring rotating along with said case, a plurality of propeller devices, including blades, located in said casing in spaced axial relationship with said blades adapted to be located within said hydraulic ring, said propeller devices also including means for varying the pitch of said propeller devices from a position where said blades lie in a radial plane of said hydraulic ring to a position transversely of said radial plane, a pair of hollow telescoped shafts extending into said case and mounted concentrically with respect thereto, one of said propeller devices mounted to rotate with one of said shafts and the other of said propeller devices mounted to rotate with the other of said shafts, driving means for operatively connecting one of said shafts with said driven shaft to rotate said driven shaft in one direction and means for operatively connecting the other of said shafts with said driven shaft to rotate said driven shaft in the opposite direction, a third shaft extending through the inner of said telescoped shafts to a position between said propeller devices, an actuating member overlying said inner telescoped shaft and being mounted for axial slidable movement with respect thereto and being positioned between said propeller devices and said actuating member being formed for selective engagement with said pitch varying means, and means operably connecting said third shaft and said actuating member, whereby on axial movement of said third shaft said actuating member can be slid to engage one or the other of said pitch varying means or can be positioned between the same to retain the blades of both of said propeller devices in radial planes.

References Cited in the file of this patent

UNITED STATES PATENTS

| | | |
|---|---|---|
| 2,557,799 | Salmivuori | June 19, 1951 |
| 2,938,397 | Lemmetty | May 31, 1960 |
| 2,939,328 | Sinclair | June 7, 1960 |